April 18, 1950

W. W. JUKKOLA ET AL 2,504,695

PROCESS FOR REMOVING SILICA FROM
WATER BY WAY OF ION EXCHANGE

Filed April 14, 1945

INVENTOR:
WALFRED W. JUKKOLA,
ELLIOTT J. ROBERTS,

BY Arthur Middleton

ATTORNEY

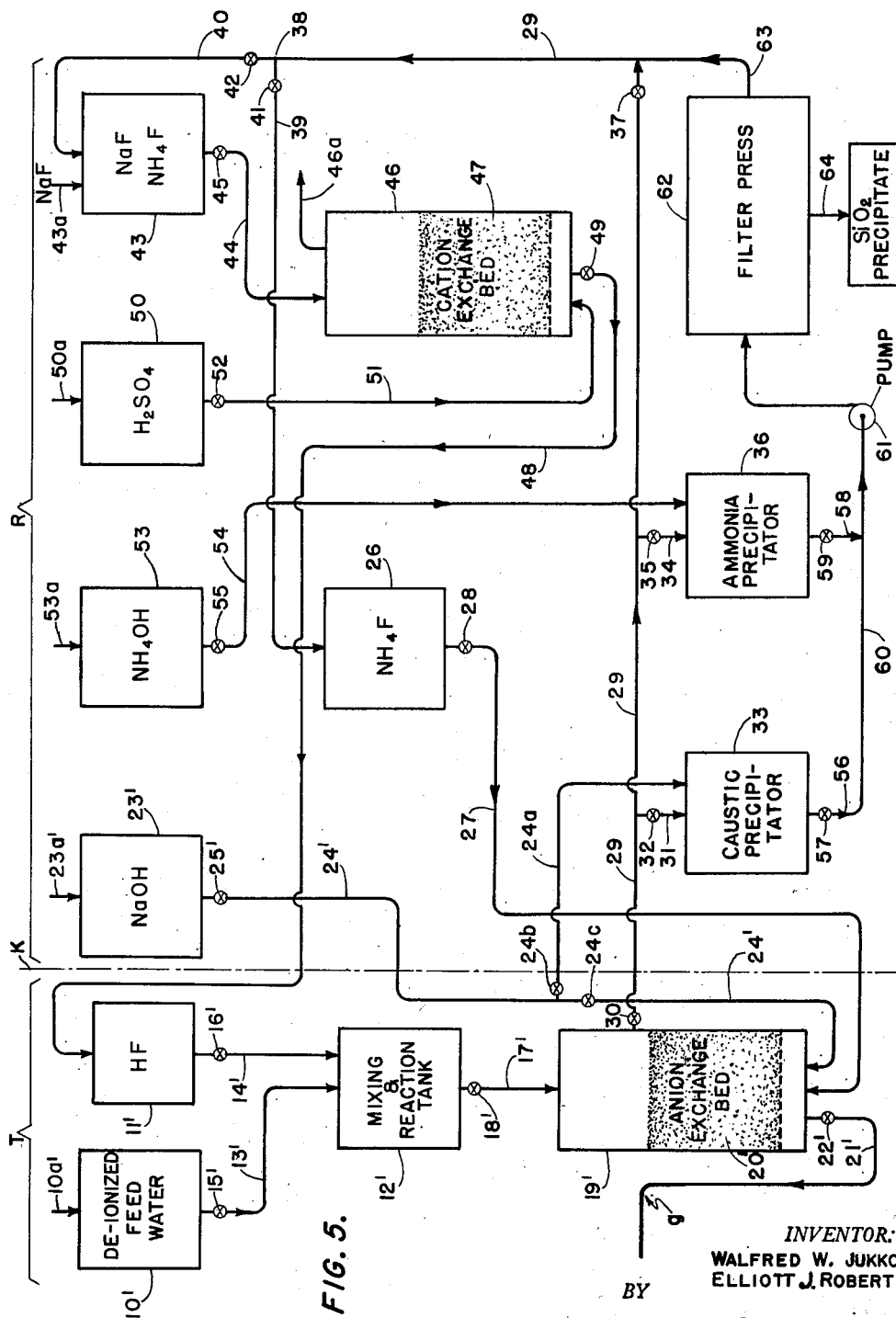

INVENTOR:
WALFRED W. JUKKOLA,
ELLIOTT J. ROBERTS,
BY Anton Middleton
ATTORNEY

Patented Apr. 18, 1950

2,504,695

UNITED STATES PATENT OFFICE 2,504,695

PROCESS FOR REMOVING SILICA FROM WATER BY WAY OF ION EXCHANGE

Walfred W. Jukkola and Elliott J. Roberts, Westport, Conn., assignors to The Dorr Company, Stamford, Conn., a corporation of Delaware Application April 14, 1945, Serial No. 588,388

8 Claims. (Cl. 210—24)

This invention relates to chemical water treatment, and more in particular to the treatment of boiler feed waters for silica removal.

The removal of silica from boiler feed waters has become an important problem in recent years with the trend for higher pressure boilers. Under high pressure operating conditions boiler tube failures have often been traced to silicious deposits and trouble is also encountered from these deposits on turbines and in superheaters.

All sources of natural waters contain some dissolved silica and surface waters, a usual occurrence being about 10–15 P. P. M. $SiO_2$, and in addition usually contain suspended silica. The removal of suspended silica can generally be obtained by coagulation and filtration while chemical processes are necessary for removal of the colloidal and dissolved silica. Several chemical processes have been developed for this purpose, but nearly all fail to remove the silica to a low enough tolerance and many processes increase the salt content of the water. The silica tolerance or maximum amount of silica allowed in the boiler feed waters have not been definitely established, but as complete as possible a removal of silica is desirable, especially under high pressure boiler operating conditions, because of the greater tendency of the $SiO_2$ to form highly insoluble compounds at the higher temperatures and higher pressures. Indeed, silica compounds formed under these conditions may not entirely yield even to scale removal treatment with NaOH.

Some treatment methods may reduce the silica content in the feed water, leaving the balance of $SiO_2$ to be reacted with NaOH or other well known conditioning chemicals to produce soluble reaction products, for instance by the reaction:

which merely changes the silica to a form less scale-producing, but still presenting the problem of reducing these reaction products to a minimum concentration so as to avoid their possible corrosive effect within the boiler system.

Another example of conventional methods of silica removal is what may briefly be called the Magnesia Method. Magnesia (MgO) or magnesium hydroxide (MgOH) added to the water binds the $SiO_2$ and precipitates it in some flocculant form removable by filtration; yet this introduces and leaves in the water an excess of the conditioning chemical which in turn increases the water hardness and eventually forms scales in combination with $SiO_2$. Moreover, an undue excess of conditioning chemical would be required to remove the silica to the extent desired.

A combination method provides for removing first one portion of the $SiO_2$ by magnesia treatment, and converting the remainder by NaOH-treatment.

While feed water free of $SiO_2$ and other solutes or salts is attainable by using the condensate of a low pressure boiler as feed water for a high pressure boiler, this invention has for its object to devise a chemical method for effecting economically the substantially complete removal of $SiO_2$ from the feed water.

Still other methods of feed water treatment are based on the ion exchange principle which involves contacting the water with ion exchange materials briefly termed ion exchangers or exchangers, such as zeolites, or with those organic or synthetic resinous exchange materials now known as organolites. But any such exchange treatment as now known fails to remove silica as contained in the water.

One such method, whereby ionized solutes can be removed or abstracted from the water, involves the treatment of the water in two sequential exchange stages, namely first with a cation exchanger and then with an anion exchange material, whereby the solutes which are susceptible to such treatment are chemically replaced with the molar equivalent of pure water.

An understanding of the operation of this sequential exchange principle is desirable in connection with the present invention, and it is therefore more fully explained as follows:

The cation exchange material in that instance is saturated with H-ions and therefore also called an H-ion exchange material. It releases H-ions into the water in exchange for the molar equivalents of cations of the solutes. To the extent of that exchange the corresponding acid is formed in the water passing through a bed of H-ion exchange material. The water thus acidified is then passed through a bed of anion exchange material capable of neutralizing the acid in the sense that it releases OH-ions in exchange for the anions of the acid, forming pure $H_2O$, or else in the sense that the acid molecule as such is adsorbed by the exchanger. The anion exchange material is therefore also known as an acid adsorbing material. In due course of such operation the exchangers lose their exchange capacity which can be restored by regeneration, that is by contact with a suitable regenerant solution which in the case of the H-ion exchange material is a suitable mineral acid such as $H_2SO_4$ or HCl, and in the case of the anion exchange material an alkali such as $Na_2CO_3$, of suitable concentration.

While the sequential cation and anion exchange treatment will serve to abstract from the water solutes sufficiently strongly ionized, there are instances or treatment problems involving the use of only the one or the other of these exchange stages. For instances, a water or liquid may be subjected to H-ion exchange only, and the resulting liquid be neutralized in some manner other than by anion exchange, or else a water or liquid already acid may be de-acidified by being contacted with the anion exchange or acid adsorption material.

This invention proposes to effect a substantially complete removal of the silica ($SiO_2$) by subjecting the water to an auxiliary reaction converting the silica in the water into a suitable acid, and then removing that acid from the water by contact with an acid adsorbing or anion exchange material.

When water to be treated passes downwardly through a bed of exchange material, the exhaustion of the bed progresses downwardly from end to end of the bed; that is, the exhausted upper portion of the bed keeps on growing downwardly as the unexhausted portion below it diminishes, until exhaustion has reached the bottom of the bed, at which time regeneration is required. The substantial exhaustion of the exchange capacity of the bed as a whole is indicated by what is known as the breakthrough; that is the appearance of those ions in the effluent which the exchange material is normally expected to remove. If a regenerant solution is passed through the bed, then regeneration proceeds in a similar progressive fashion, namely from one end of the bed to the other. It can be said that a certain exchange material has a certain inherent exchange capacity as well as inherent regeneration requirements under predetermined operating conditions.

Cation as well as anion exchange materials adapted to function in the manner above indicated, are exemplified by a group of materials now known as organolites because they are of an organic, that is synthetic resinous nature, as distinguished from earlier cation exchange materials, the so-called zeolites, which are of inorganic nature.

In the co-pending patent application of Roberts, Ser. No. 751,682, the water is subjected to auxiliary treatment whereby the silica ($SiO_2$) is converted into a suitable acid, namely one that is removable from the water by ion exchange treatment such as can be effected by means of the aforementioned treatment with a regenerable anion exchange or acid adsorbing material.

Such auxiliary treatment comprises first subjecting the raw water to de-mineralization treatment by sequential contact with cation and anion exchange materials, which treatment is followed by the silica removal treatment which is based on the concept that the silica must be converted into an acid which in turn can be removed by the anion exchange material.

Such auxiliary treatment further comprises reacting the silica ($SiO_2$) with hydrofluoric acid (HF) to the end of producing hydrofluosilicic acid ($H_2SiF_6$) which in turn is abstracted from the water by treatment with the anion exchange material.

In such auxiliary treatment a zone or band of HF held by the anion exchange material is allowed or caused to form in the exchange bed, and this zone or band by way of the ion exchange phenomena taking place is in effect caused to progress or shift through the bed ahead of the zone of exhaustion that develops in the bed; that is as the exchange bed becomes progressively exhausted by the acid reaction product ($H_2SiF_6$) being taken up, there is maintained in advance of that exhausted portion the band or zone of HF.

In such auxiliary treatment the anion exchange bed following its regeneration with alkali is further conditioned so that it will promptly operate at high efficiency in effecting $SiO_2$ removal. Such conditioning is effected by passing through the bed a sufficient quantity of HF solution to establish a desirable HF-zone at the influent end of the bed prior to starting the passage of water through the bed for silica removal.

In such auxiliary treatment a bed of anion exchange material serving to effectuate the auxiliary reaction as well as the removal of the resulting reaction product or acid ($H_2SiF_6$), is operated in a manner whereby the fluoride (HF) breakthrough and the subsequent silica breakthrough serve as criteria indicating the degree of exhaustion of the anion exchange bed.

In one embodiment of such auxiliary treatment the water from which the silica is to be removed is passed through a pair of anion exchange beds operating in series, whereby the first bed can be substantially fully exhausted with a minimum loss of HF. The complete exhaustion of the first bed is possible according to this mode of operation since the HF-zone or band reaching the end of the first bed is eventually further displaced therefrom and without loss transferred to the next fresh bed while water continues passing through these beds. The transfer of the HF-zone is due to certain affinities of the solutions involved with respect to the exchange material, as will be more fully explained.

Such auxiliary treatment also provides that to the water having been deionized by sequential anion and cation exchange treatment, there shall be added substantially only the theoretical amount of HF needed for reaction with the $SiO_2$ of the water.

Such auxiliary treatment provides for modes of regenerating the anion exchange bed exhausted under these conditions with silica compound, in such a manner that the silica is substantially completely removed from the bed in spite of the tendency of silica to be precipitated on the exchange material. By such modes of regenerating the bed the silica is removed from the bed in a soluble form as effluent.

Therefore, the anion exchange bed having been saturated or exhausted with $H_2SiF_6$ is regenerated with an alkali regenerant such as NaOH at an unusually high dilution.

It is one object of this invention to reduce the expenditure of regenerant chemicals and more in particular the expenditure of the fluoride. To this end the invention proposes to operate a water treatment silica removal system in conjunction with a fluoride recovery system in which to treat the spent regenerant liquors to effect the recovery of fluoride therefrom for re-use in the water treatment system. This invention provides a fluoride recovery system to operate in circuit with the silica removal system. Since the fluoride moves repetitively through that circuit this is herein termed the cyclic silica removal process as distinguished from the process referred to in the aforementioned co-pending patent application and which may be termed the non-cyclic process because it lacks fluoride recovery.

In the Non-cyclic Process the HF or conditioning reagent needed leaves the treatment system or goes to waste, whereas in the Cyclic Process the HF is recovered or isolated from spent regenerant liquors and is reused as a conditioning agent in the further removal of silica from water.

An embodiment of the cyclic process comprises the following phases: (a) the phase of removing the $H_2SiF_6$ from the exhausted anion exchange bed in the form of a spent regenerant solution in which it is not too dilute to hamper the isolation therefrom of the silica, and yet in which no silica will precipitate in the bed; (b) the phase of isolating or precipitating and removing the silica from the spent regenerant solution so as to derive a fluoride solution without the silica; (c) the phase of converting the silica-free fluoride solution into HF-solution to be re-used for conditioning silica-containing water; (d) the phase of conditioning the raw water for the silica removal step; and (e) the phase of silica removal itself in which the anion exchange bed becomes saturated with $H_2SiF_6$, which leads back to the phase (a) of the cycle.

In this embodiment of the cyclic process there is coupled with the cycle of the above phases (a) to (e) an auxiliary or intermediate regeneration treatment of the anion exchange bed; that is, the bed having been exhausted with $H_2SiF_6$ (hydro-fluo-silicic acid) in the silica removal step, is intermediately treated with an auxiliary regenerant solution such as $NH_4F$ (ammonium fluoride) which yields the silica from the bed as $(NH_4)_2SiF_6$ in the spent regenerant solution, the silica thus being in a state of sufficient concentration as well as sufficient solubility. However, since this leaves the bed saturated with HF there follows the second or final regeneration of the bed, namely with a hydroxide or a caustic such as NaOH which allows the fluoride as NaF in the spent solution thus there are derived from the two phases of anion bed regeneration two separate kinds of regenerant liquors containing the silica as $(NH_4)_2SiF_6$ (ammonium-fluo-silicate) and as NaF respectively; therefore, requiring respective separate treatments to produce from them the reagents for re-use in the process. Thus the NaF produces the HF needed for re-use directly through ion exchange substitution of H for the Na. Whereas the $(NH_4)_2SiF_6$ is reacted with hydroxide or caustic such as NaOH in what may herein be termed Caustic Precipitation to precipitate the silica while yielding a solution mixture of fluorides such as NaF and $NH_4F$, which mixture in turn can also be converted to HF for re-use by substituting H for the respective cations Na and $NH_4$ in a cation exchange treatment step. However, at least a part of the $NH_4F$ needed in the process for intermediate or auxiliary regeneration of the anion exchange bed can be provided by reacting a portion of the available $(NH_4)_2SiF_6$ with $NH_4OH$ in what may herein be termed Ammonia Precipitation. The respective proportions of HF and of $NH_4F$ which are thus to be recovered by the respective caustic and ammonia precipitations, depend upon the fluoride balance to be maintained in the cyclic process.

Hence chemical reagents required in this embodiment of the cyclic process are:

HF for conditioning the raw water;
$NH_4F$ for the auxiliary regeneration of the anion exchange bed;
NaOH for final regeneration of the anion bed as well as for the Caustic Precipitation of the silica from the spent auxiliary regenerant liquor;
$NH_4OH$ for the Ammonia Precipitation of the silica from the spent auxiliary regenerant liquor;
$H_2SO_4$ regenerant solution for maintaining the cation exchange cycle of an auxiliary cation exchange bed.

The total requirements of NaOH, $NH_4OH$, and $H_2SO_4$ are provided from an outside source, whereas HF and $NH_4F$ are largely recovered within the process and re-used so that only small make-up quantities thereof are needed from an outside source. The HF make-up can be provided in the form of NaF since the Na can be replaced with H-ions by cation exchange treatment.

Therefore, one feature of the Cyclic Process lies in the auxiliary regeneration of the exhausted anion exchange bed with $NH_4F$ regenerant solution, and the precipitation of the silica from the resultant spent liquor to yield fluoride solutions for re-use in the process. Since this auxiliary regeneration leaves the bed saturated with HF the bed receives a final regeneration treatment with caustic producing an effluent fluoride solution convertible by cation exchange into HF for re-use as the initial conditioning reagent for the water.

Other features deal with the manner of the precipitation of the silica from the effluent liquors flowing from the anion exchange bed, namely, by Caustic Precipitation and by Ammonia Precipitation. Such features also deal with the manner of recovery and treatment for re-use of the fluoride solutions resulting from such precipitation treatments.

According to one feature, the spent regenerant liquor resulting from the auxiliary regeneration of the anion exchange bed has its silica precipitated by Ammonia Precipitation producing ammonium fluoride solution for re-use as the auxiliary regenerant for the anion exchange bed.

According to another feature, a part of the spent regenerant liquor resulting from the auxiliary regeneration of the anion exchange bed has its silica precipitated by Caustic Precipitation producing a mixture of fluoride solutions convertible into HF solution by cation exchange, for re-use as the initial conditioning reagent for the water, while another part is subjected to Ammonia Precipitation.

Another feature provides for the combined use of Caustic Precipitation and Ammonia Precipitation in treating the spent auxiliary liquor from the anion exchange bed for silica precipitation. By treating one portion of the liquor by Caustic Precipitation and another portion by Ammonia Precipitation there are derived separate fractions of fluoride solutions for re-use, namely ammonium fluoride as one fraction, and a mixture of fluorides as the other fraction. More specifically, this feature provides that a first portion of the spent liquor be subjected to the Caustic Precipitation, whereas a second or subsequent portion of the spent liquor be subjected to the Ammonia Precipitation treatment.

Still another feature provides that the spent effluent liquor from the second stage or final regeneration of the anion exchange bed may be subjected to Caustic Precipitation treatment yielding fluoride solutions which in turn by way of cation exchange treatment will produce HF for re-use as the initial conditioning reagent for the water.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a flowsheet diagram for the removal of silica according to the Non-Cyclic Process.

Fig. 5 is a flowsheet diagram for the removal of silica according to the Cyclic Process.

Figs. 6, 7, 8, 9, and 10 represent the flowsheet of Fig. 5, each figure, however, indicating a different phase of the operating cycle.

Figure 6:
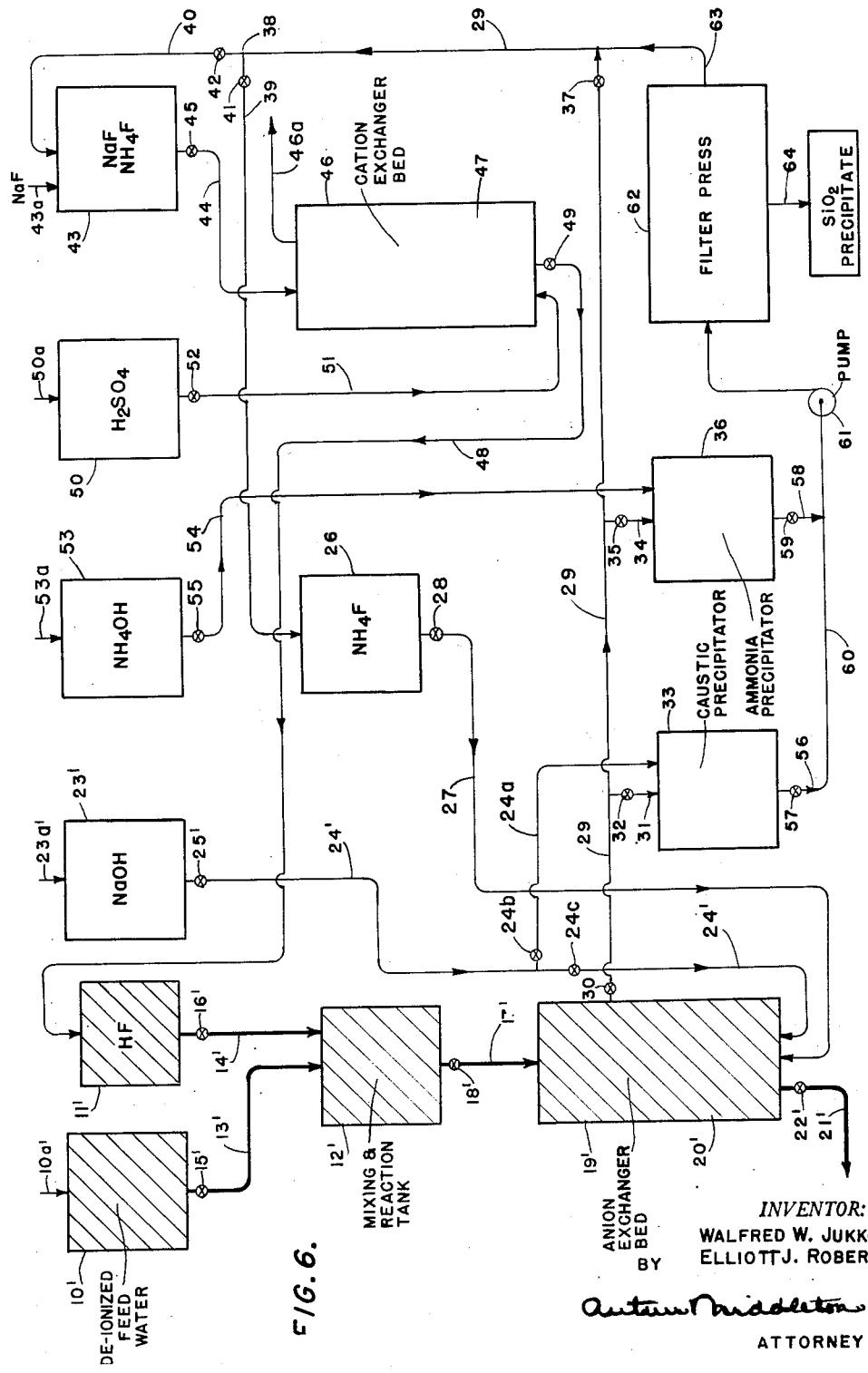

Fig. 6 indicates the feedwater treatment phase.

Figure 7:
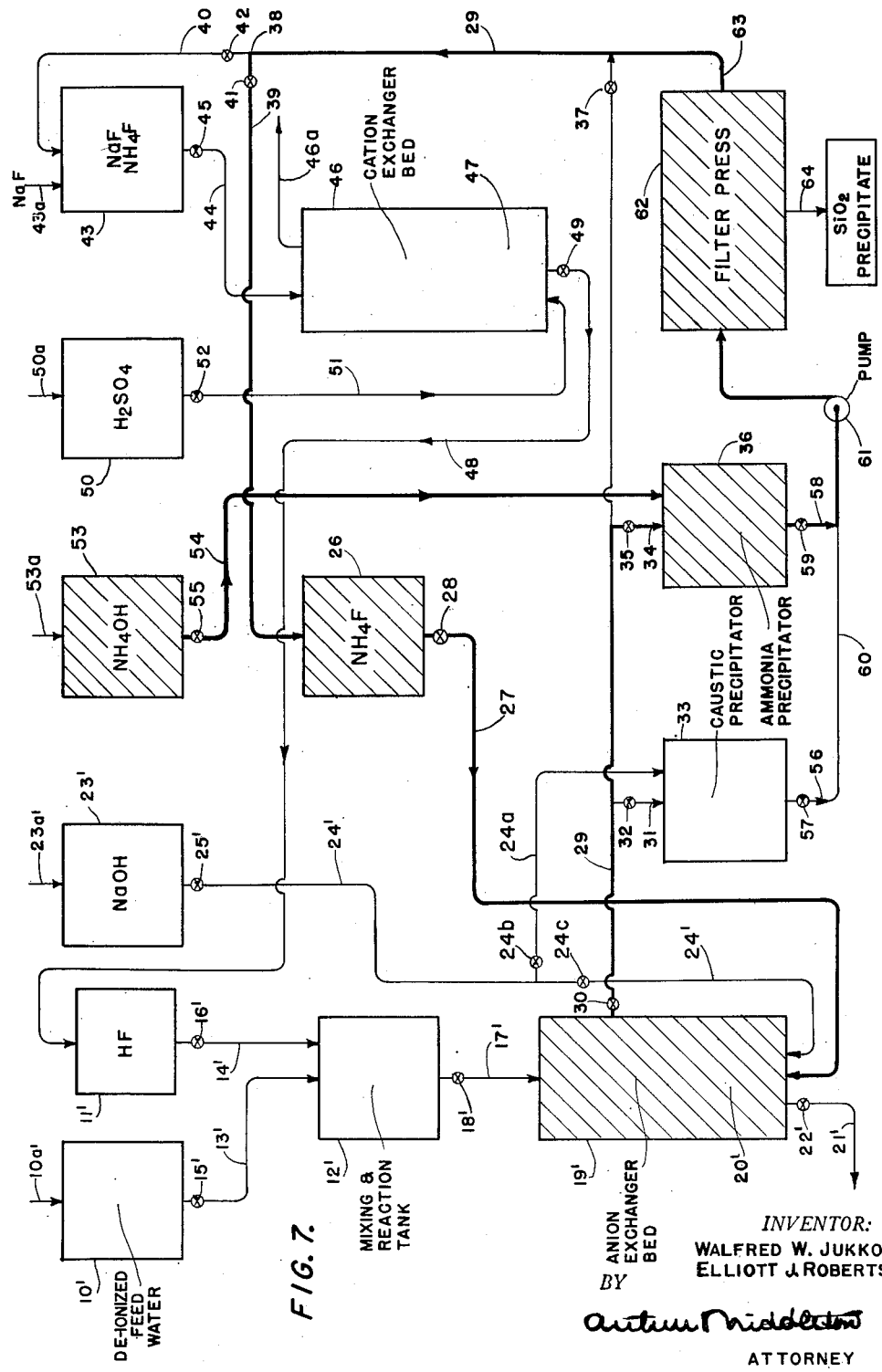

Fig. 7 indicates the auxiliary regeneration phase with fluoride recovery by ammonia precipitation.

Figure 8:
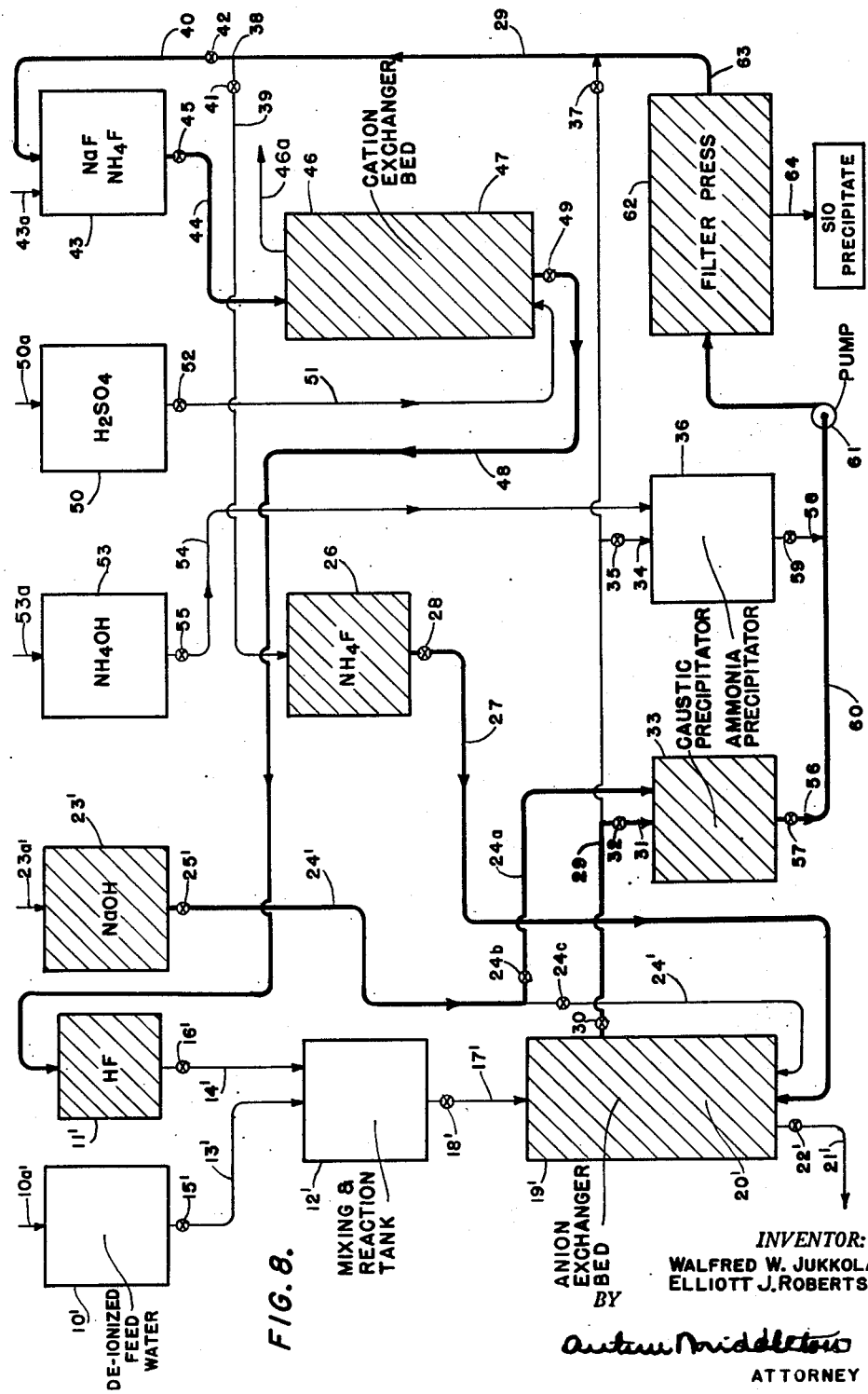

Fig. 8 indicates the auxiliary regeneration phase with fluoride recovery by caustic precipitation.

Figure 9:
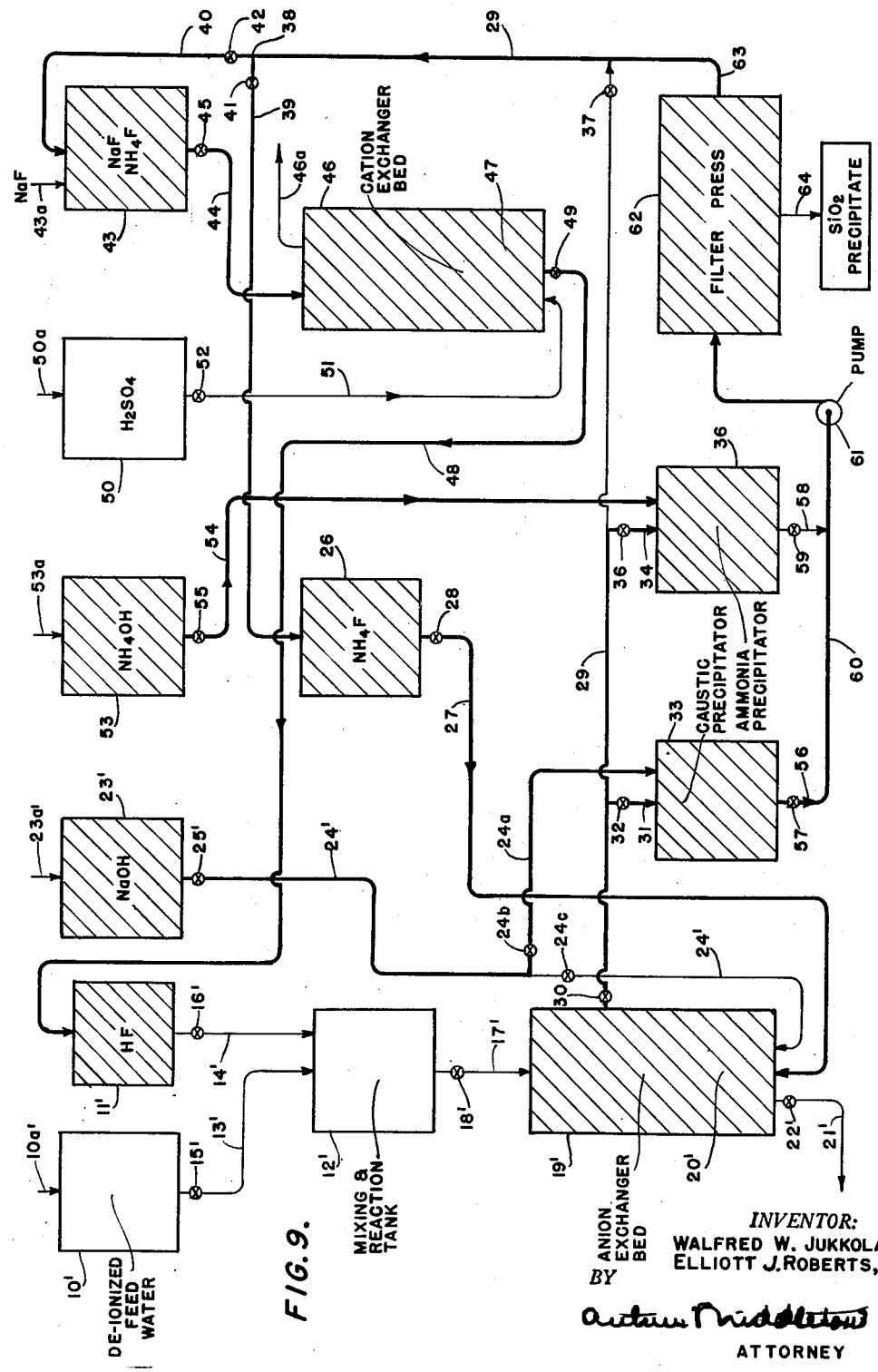

Fig. 9 indicates the auxiliary regeneration phase with fluoride recovery by combination caustic and ammonia precipitation treatment.

Figure 10:
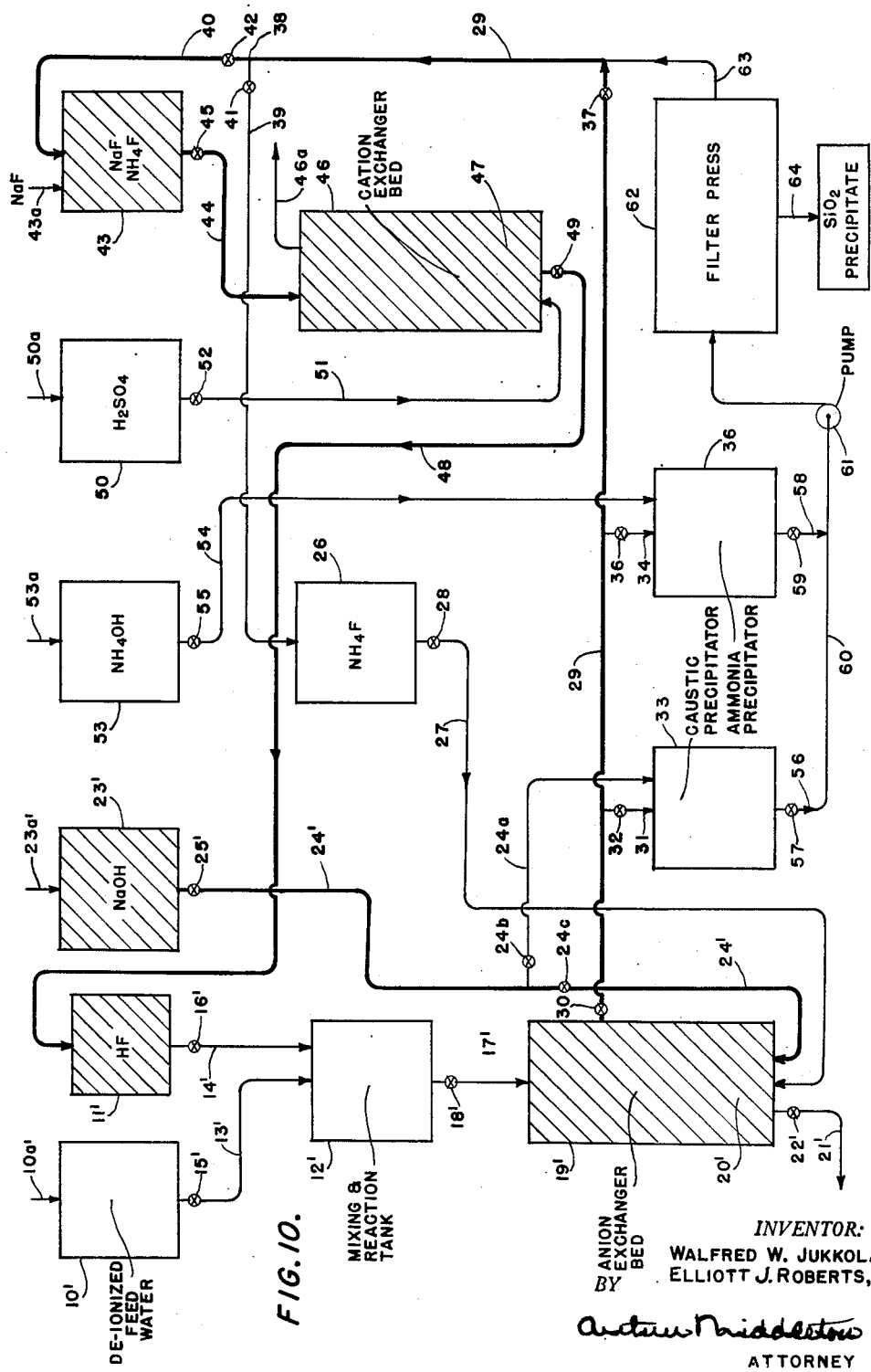

Fig. 10 indicates the second or caustic regeneration phase of the anion exchange bed.

Figure 11:
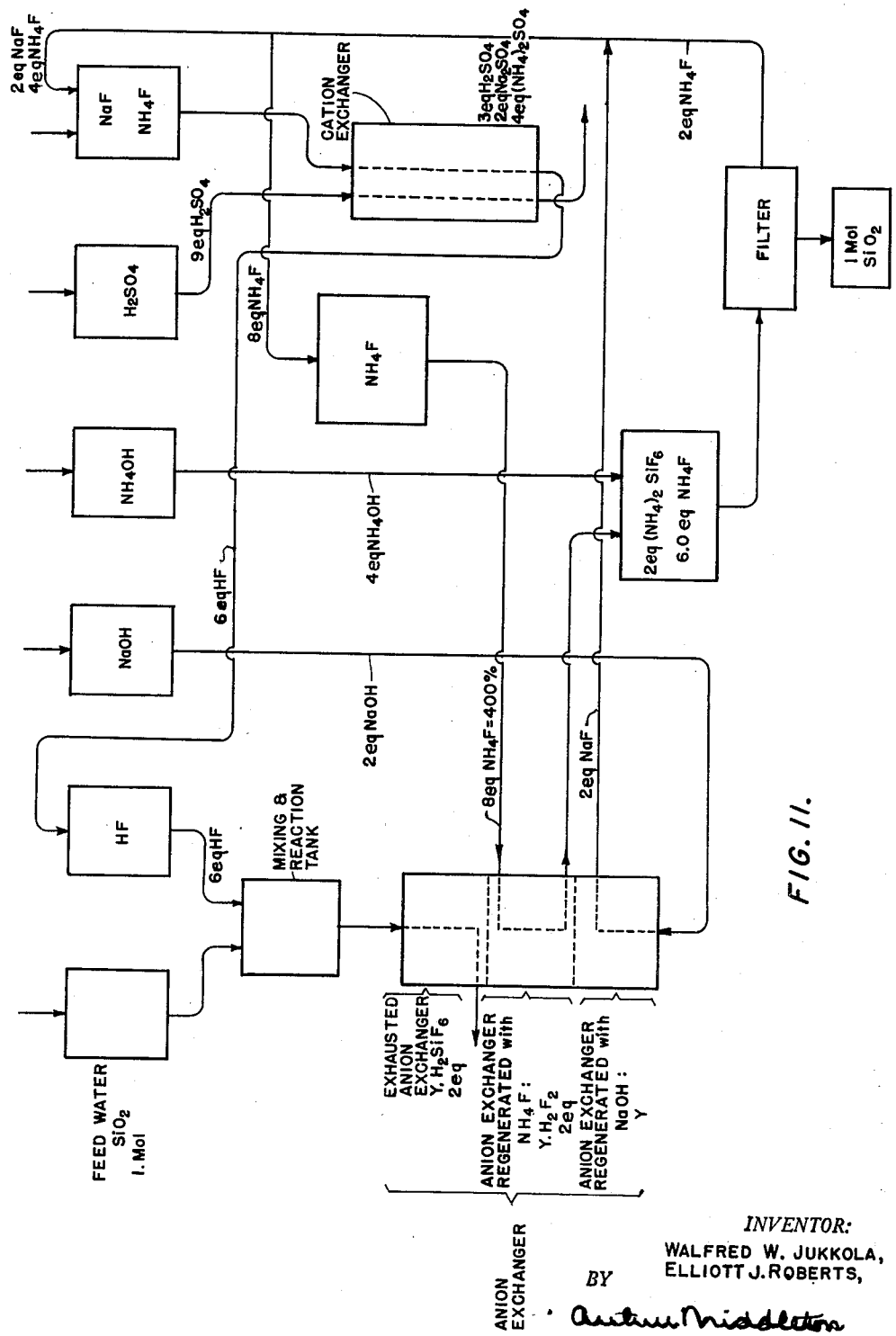

Fig. 11 is a chemical flowsheet, that is a diagram of the Cyclic Process indicating the chemical requirements with ammonia precipitation of the silica.

Figure 12:
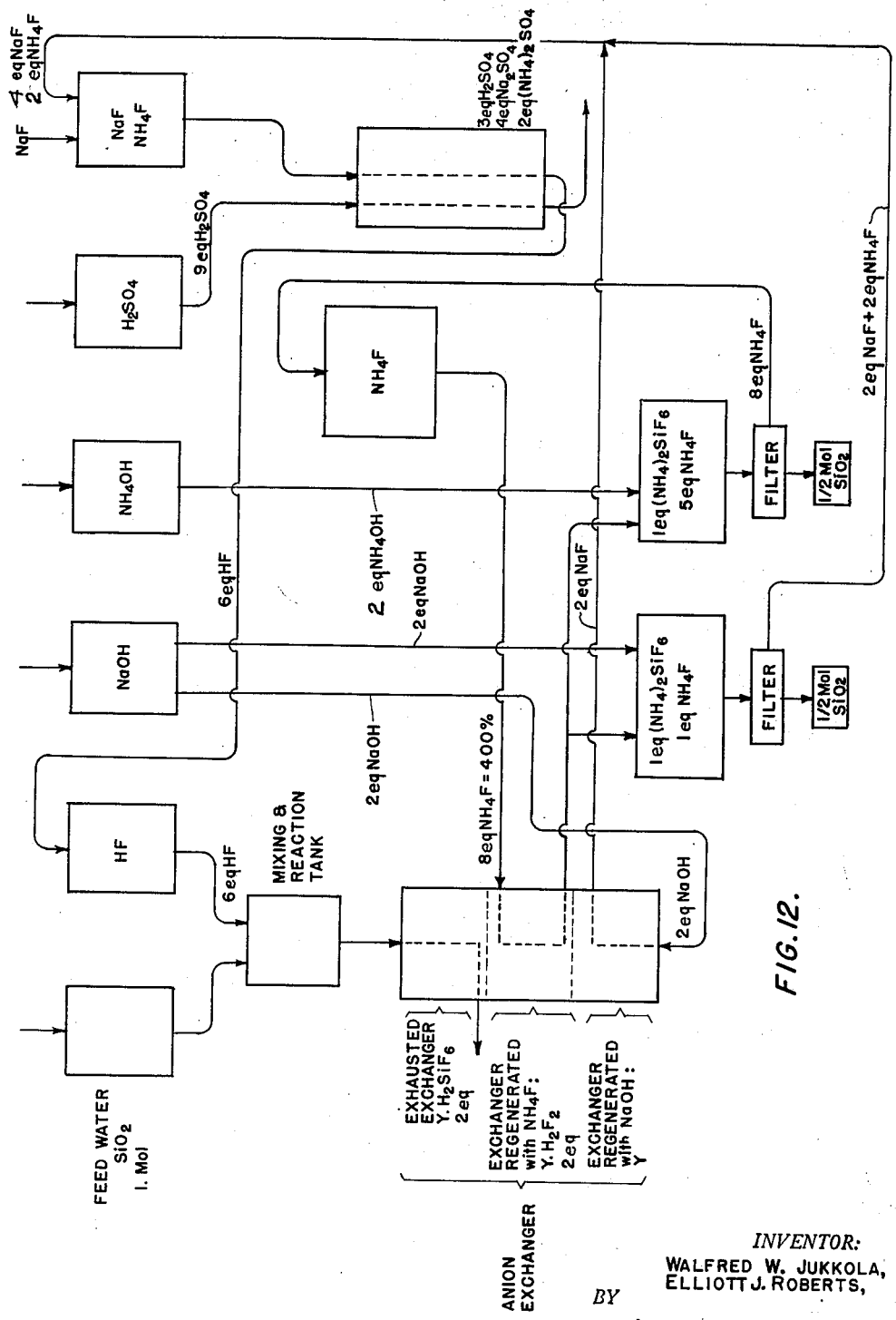

Fig. 12 is a chemical flowsheet of the Cyclic Process indicating the chemical requirements with a combination of caustic and ammonia precipitation of the silica.

Figure 1:
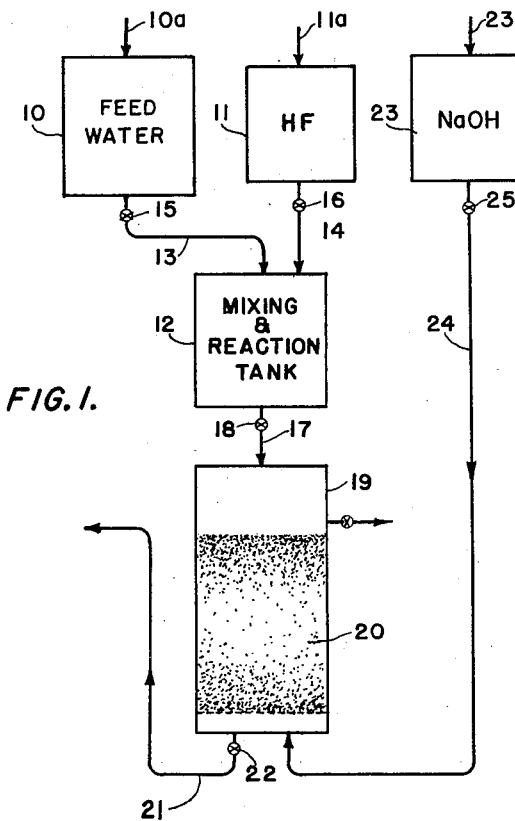

The flowsheet diagram of Fig. 1 of the Non-Cyclic Process provides a feedwater tank 10; that is, a tank for storing the water from which the silica is to be removed, provided with a feedwater supply 10$^a$. The feedwater to be subjected to the silica removal treatment of this invention should be substantially free from dissolved salts. Therefore it is desirable to have the ionized solutes substantially removed from the water by a preceding de-ionization treatment, whereby the non-ionized silica is left in the water to be separately removed as by this process. For the sake of simplicity it will be assumed for this flowsheet that de-ionized water having the silica left in it is contained in tank 10. A tank 11 provides for the storage of the initial conditioning reagent, namely HF solution of a suitable concentration, for admixture to the feedwater. The tank 11 has a connection 11$^a$ for supplying HF thereto. A mixing or reaction tank 12 is provided for such conditioning. Flow connections or conduits 13 and 14 lead from the tanks 10 and 11 respectively to the mixing and reaction tank 12, and are provided with control valves 15 and 16 respectively. A flow connection 17 provided with control valve 18 leads from the reaction tank 12 to a tank or cell 19 containing a bed of known granular anion exchange material 20 also termed acid-adsorbing material, for instance an organic material of the class of synthetic resins sometimes also briefly called exchange resins. The tank 19 will herein be termed the exchange tank or cell. An effluent conduit 21, having a control valve 22, leads from the bottom of the exchange tank 19 and forms a goose neck G presenting a hydraulic column sufficiently high to balance the liquid level in the exchange tank whereby the substantial submersion of the exchange bed 20 during operation is insured.

The feedwater from tank 10 and the HF solution from tank 11 are mixed in the conditioning or reaction tank 12 where silica of the water reacts with HF to produce hydrofluosilicic acid as follows:

(1) 
$$6HF + SiO_2 \rightarrow H_2SiF_6 + 2H_2O$$

The resulting acid is then removed from the water by contact with the anion exchange bed 20 through which the water is passed for instance downwardly, thus producing a substantially silica-free effluent water leaving the bed through an effluent conduit 21.

A storage tank 23 with a supply therefor indicated at 23$^a$ contains NaOH for regenerating the anion exchange bed 20 after it has been exhausted with $H_2SiF_6$, a supply connection 24 with control valve 25 leading to the exchange tank 19.

While the overall function of the anion bed in removing silica from water dosed with HF lies in the fact that it absorbs $H_2SiF_6$ just as it would absorb such acids as $H_2SO_4$, yet the actual chemical mechanism is not so direct, involving transitional reactions. If water containing $H_2SiF_6$ is passed through a freshly alkali regenerated bed the effluent is not silica-free until a large quantity of the water has passed. This transitional period may be avoided by applying a quantity of HF to the bed after alkali regeneration before any water is passed through the bed for treatment. In this way a protective band of HF absorbed on the bed of exchange material is established and if water containing $H_2SiF_6$ is passed through such a preconditioned bed, the effluent is silica-free right from the start of the water treatment phase. This band progresses through the exchange bed as the bed becomes progressively exhausted. The efficient removal of the silica is due to the presence of this band because it prevents direct contact of the $H_2SiF_6$ in the water with the unexhausted (alkali regenerated) portion of the bed. In other words the water always passes through an HF-zone before it contacts the alkali regenerated portion of the bed. The $H_2SiF_6$ displaces HF from the influent side of the HF-zone and the displaced HF is reabsorbed by the fresh exchange material at the effluent side of the zone. In this way the aforementioned progress of the HF-band takes place. Chemically the function of this HF band is that it prevents decomposition of the $H_2SiF_6$ with consequent formation of silica and leakage thereof with the treated water, which would take place were the $H_2SiF_6$ allowed to come in direct contact with the unexhausted portion of the bed which is alkaline in reaction and would therefore cause the aforementioned decomposition of the $H_2SiF_6$.

Another important aspect of the formation and effect of the HF-band is that with such an HF-band properly established in the bed, reasonable fluctuations in the HF dosing rate will be equalized as far as the effluent is concerned, in that the HF band decreases or increases in absorbing these dosing fluctuations. This equalizing effect enables one to dose with the theoretical quantity of HF without danger of silica leakage into the effluent even though in practical operation precise dosing rates may not be possible.

Figure 2:
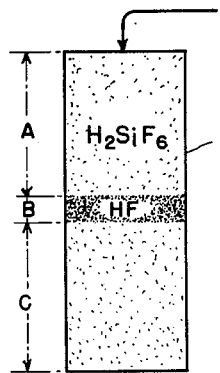
Fig. 2 is a schematic showing of the anion exchange bed to illustrate the function of the HF band.

This condition can be graphically visualized by reference to the Fig. 2 diagram showing the anion exchange bed N in an intermediate state of exhaustion. A top zone A saturated with $H_2SiF_6$ represents the exhausted portion of the bed, while a relatively shallow intermediate zone or band B is saturated with HF, and a lower or bottom zone C represents the unexhausted portion of the bed.

Since it is desirable that the HF-band be present at the top of the bed when the feedwater is started into the bed such a band or zone may be established prior to starting the operation by adding a sufficient amount of HF to the top of the bed, the bed itself having previously been saturated with OH-ions by regeneration with an alkali solution, for instance NaOH.

Figure 3:
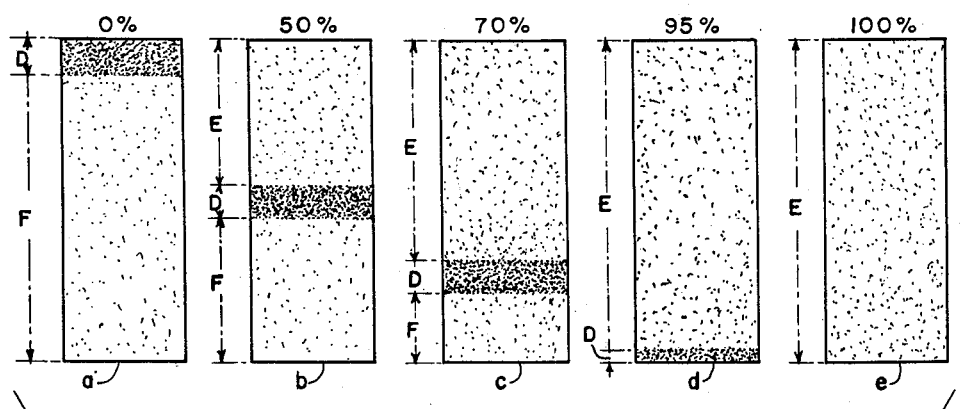
Fig. 3 is a schematic showing of the anion exchange bed in various stages of exhaustion, and illustrating the progress of the HF band through the bed and its final complete displacement.

The progress of exhaustion of the anion exchange bed, as indicated by the progress of the HF-band therethrough, is graphically shown in Fig. 3 (sub-figures $a$ to $e$) representing an HF-band D, a zone of exhausted material E, and a zone of unexhausted material F of the bed. These figures incidentally indicate the bed as being about 0%, 50%, 70%, 95%, and 100% exhausted, respectively. Consequently the HF-band is shown in consecutive stages of downward progress through the bed. In the Fig. $a$ condition the bed is unexhausted and an HF-band has been provided at the top. In the Fig. $b$ condition the HF-band has moved approximately halfway down the bed. In the Fig. $c$ condition the HF-band approaches the bottom of the bed as the same approaches exhaustion. In the Fig. $d$ condition a portion of the HF-band has been displaced by $H_2SiF_6$ indicating what is herein called the condition of the HF breakthrough of the bed, since the displaced portion of the HF-band now appears in the effluent water. If the exhaustion is still further continued the HF-band will be completely displaced, leaving the bed substantially totally exhausted or saturated with $H_2SiF_6$, this being the Fig. $e$ condition which is substantially incidental to what is herein termed the silica breakthrough condition of the bed; that is, as the HF-band disappears, the effluent water will then show it in substantially the same condition as the influent water—with a portion of $H_2SiF_6$, a portion of $SiO_2$ and a portion of HF—since the bed will then have become substantially ineffective.

Figure 4:
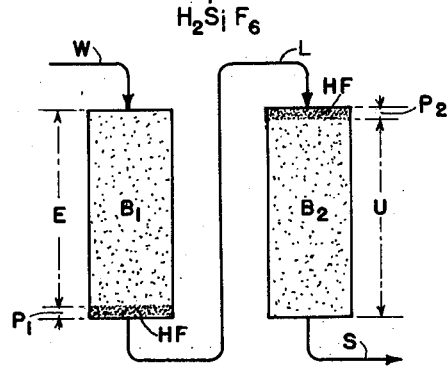
Fig. 4 is a schematic view of a pair of anion exchange beds operating in series, in the process of being exhausted, to illustrate the transfer of the HF band from a first to a second bed.

In order to preserve the HF contained in the HF-band a pair of anion exchange beds may be operated in series (see Fig. 4). This shows two anion exchange beds $B_1$ and $B_2$ in series, with feedwater entering at W flowing downwardly through bed $B_1$, the effluent water from that bed being transferred as along line L to the top of bed $B_2$ and passing through the same and leaving the bed as silica-free water indicated at S. The beds $B_1$ and $B_2$ are shown in a condition where the bed $B_1$ has been exhausted to the point where a portion of the HF band has been displaced from the bottom of the bed $B_1$ and appears transferred to the top of the bed $B_2$. The bed $B_1$ in this condition comprises an exhausted portion E, and a portion $P_1$ of the HF-band, while the bed $B_2$ comprises a portion $P_2$ of the HF-band and an unexhausted portion U. In this way an HF-band will be established at the top of the second bed at the rate at which it is being displaced at the bottom of the first bed. In this manner the first bed can be completely exhausted past the silica breakthrough condition, since the HF-band being displaced at the bottom is intercepted and re-established at the top of the second bed. This condition of transferring the exchange function as well as the HF-band from the first bed to the second bed is indicated in Fig. 4 showing a first bed $B_1$ and a second bed $B_2$ with a portion of the HF-band still left at the bottom of the first bed and the balance of the HF band having been established at the top of the second bed. In other words, the HF-band desired to be present at the start of the operation of an anion exchange bed can be automatically obtained by using a series of beds if a second regenerated and washed bed is placed in series with a bed being exhausted shortly before the fluoride breakthrough occurs, the fluoride leakage will be cut by the second bed. Hence, if the first bed is exhausted until the silica in the effluent is nearly identical with the silica in the feed-water the HF band will be completely transferred from the bottom of the first to the top of the second bed because the strong bivalent $H_2SiF_6$ displaces the weak monovalent HF from the one bed to the next.

The following tabulation represents an effluent water analysis during the exhaustion period of the anion exchange bed indicating numerically where the fluoride breakthrough and the silica breakthrough occur respectively, this being the result of a test run on an anion exchange bed 10" deep and 1" in diameter. There is a rough relationship between the degree of exhaustion shown in the diagram Fig. 3 (sub-figures $a$ to $e$) which is indicated by the marginal references to these figures in the following Effluent analysis tabulation.

| Volume of Feed through Bed | Per cent Exhausted to Silica Breakthrough | pH | Specific Resistance | SiO₂ P.P.M. | Fluorides P.P.M. | |
|---|---|---|---|---|---|---|
| *liters* | | | | | | |
| 2 | 3.3 | 7.2 | 280,000 | .2 | 0 | Fig. 3a |
| 4 | 6.7 | 7.15 | 365,000 | .2 | 0 | |
| 8 | 13.4 | 7.10 | 380,000 | .1 | 0 | |
| 12 | 20.0 | 7.05 | 400,000 | .1 | 0 | |
| 16 | 26.0 | 7.00 | 400,000 | .1 | 0 | |
| 20 | 33.0 | 6.85 | 400,000 | .1 | 0 | |
| 24 | 40.0 | 6.50 | 380,000 | .1 | 0 | |
| 28 | 47.0 | 5.20 | 175,000 | .1 | 0 | Fig. 3b |
| 30 | 50.0 | 5.00 | 150,000 | .1 | .1 | |
| 32 | 53.0 | 4.7 | 100,000 | .1 | .1 | |
| 36 | 60.0 | 4.5 | 80,000 | .1 | .2 | |
| 38 | 63.0 | 4.4 | 65,000 | 0 | .6 | |
| 40 | 67.0 | 4.3 | 41,000 | 0 | 1.1 | Fig. 3c |
| 42 | 70.0 | 4.12 | 28,000 | 0 | 1.4 | |
| 45 | 75.0 | 4.00 | 20,000 | 0 | 2.0 | |
| 50 | 83.0 | 3.70 | 11,000 | 0 | 2.9 | |
| 55 | 92.0 | 3.50 | 6,500 | 0 | 5.0 | |
| 58 | 97.0 | 3.40 | 4,800 | .2 | 16.5 | Fig. 3d |
| 60 | 100.0 | 3.35 | 4,200 | 1.0 | 22.20 | |
| 62 | 104.0 | 3.20 | 3,500 | 2.0 | 24.20 | Fig. 3e |
| 64 | 107.0 | 3.20 | 2,700 | 4.0 | 28.20 | |
| 66 | 110.0 | 3.20 | 2,100 | 6.0 | 32 | |
| 68 | 114.0 | 3.20 | 1,800 | 9.0 | 40 | |
| 70 | 117.0 | 3.20 | 1,700 | 12.0 | 50 | |
| 72 | 120.0 | 3.20 | 1,700 | 16.0 | 55 | |

Annotations in table: "Here fluoride leakage starts warning of breakthrough, can be caught in second regenerated Bed"; "Break where Bed should be changed"; "Line of Silica Breakthrough"; "Fluoride present or free HF".

Alternative modes of initial treatment of the raw water in this process are herein to be considered each of which modes has its advantages depending upon the character and analysis of the raw water; that is the analysis of the solutes or salts other than the silica.

One mode of initial treatment is that which is indicated above in the description of the Non-cyclic Method of Silica Removal, namely where the raw water is first subjected to a preliminary or de-ionization treatment not shown per se in the flowsheet of Fig. 1. Such a preliminary treatment comprises passing the water sequentially through a bed of cation exchange material and through a bed of anion exchange material, whereby substantially all inorganic salts or solutes except the silica are abstracted from the water. The chemical mechanism of the de-salting or de-ionization treatment is well known per se. Suffice it to say that the cation exchange bed, having been regenerated with a suitable mineral acid such as $H_2SO_4$ of suitable concentration, is capable of substituting H-ions for the cations of the salt in the water thereby converting the salt into the corresponding acid. The water leaving the cation exchange bed thus acidified then passes through the anion exchange bed which has been regenerated with a suitable solution of alkali such as $Na_2CO_3$ of suitable concentration, and is therefore capable of adsorbing or abstracting form the water the acid which was produced by the cation exchange bed. It is also said of the anion exchange bed that it substitutes OH-ion for the anion of the acid which has resulted from the cation exchange so that as a net result of these two ion exchange phases the molar equivalent of pure water (HOH or $H_2O$) is substituted for the salt.

The removal of these salts by this preliminary or de-ionization treatment correspondingly reduces the HF requirement for conditioning the water, inasmuch as otherwise some of the HF would react with the salts instead of with the silica. Also, having an appreciable Ca content Ca may react with HF to produce sufficient $CaF_2$ which is fairly insoluble causing precipitation trouble in the bed which in turn requires more intense backwashing for precipitate removal; thus the preliminary or de-ionization treatment in the conditioning stages of the raw water may be desirable and the expenditures for it warranted.

The HF per se is a corrosive acid and may be produced as needed by treating NaF separately by cation exchange substituting H for Na. As will be seen further below in the description of the Cyclic Process, a cation exchange bed constitutes a part or station in the cyclic operation and serves for passing therethrough NaF for make-up of and conversion into HF.

When raw water containing, as it usually does, calcium bicarbonate $(Ca(HCO_3)_2)$ is subjected to treatment in the cation bed in the de-ionization operation, there is produced free $CO_2$ dissolved in the water as follows:

(1a) 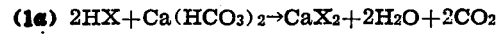 $2HX + Ca(HCO_3)_2 \rightarrow CaX_2 + 2H_2O + 2CO_2$

Ordinarily this $CO_2$ remains in the water when the same is passed through the acid adsorbing anion exchange bed.

In straight de-ionization operations this $CO_2$ is often removed by aeration. In the present process a limited amount of $CO_2$ in the water does not interfere with the efficiency of the silica removal, but where excessive amounts are present and the efficiency of the silica removal thereby affected, the $CO_2$ should be removed by aeration prior to the dosing of the water with HF.

When the anion exchange bed has become exhausted by its adsorption of $H_2SiF_6$ it must be regenerated with a solution of alkali such as $Na_2CO_3$, $NaHCO_3$, or NaOH. Usually 5% concentrated solutions of alkali are used to obtain satisfactory and economical regeneration results. We have found that the anion exchange bed thus exhausted with $H_2SiF_6$ did not lend itself to the regeneration with alkali at the usual concentrations, and that the bed could not be successfully regenerated for instance with 5% $Na_2CO_3$, 4% $NaHCO_3$, or 4% NaOH solutions because these reagents caused the precipitation of $SiO_2$ and $Na_2SiF_6$ which subsequently could only be removed by treatment with exceptionally strong (about 10%) alkali solution, which appeared to be prohibitive.

The potential trouble with the precipitation in the bed incident to alkali regeneration may be visualized from the following equations, with $Na_2CO_3$, $NaHCO_3$, and $NaOH$ respectively as the regenerant:

For $Na_2CO_3$:

(2) $\quad Na_2CO_3 + H_2SiF_6 \rightarrow Na_2SiF_6 + H_2O + CO_2$

With an excess of $Na_2CO_3$ the resulting $Na_2SiF_6$ reacts further to form a flocculent ($SiO_2$)-precipitate and ($6NaF$) solute, as follows:

(2a) $\quad 2Na_2CO_3 + Na_2SiF_6 \longrightarrow SiO_2\downarrow + 6NaF + 2CO_2$ For $NaHCO_3$:

Similarly:

(3) $\quad 2NaHCO_3 + H_2SiF_6 \longrightarrow Na_2SiF_6\downarrow + 2CO_2 + 2H_2O$ and $Na_2SiF_6$ reacting with an excess of $NaHCO_3$ as follows:

(3a) $\quad 4NaHCO_3 + Na_2SiF_6 \longrightarrow SiO_2\downarrow + 6NaF + 2H_2O + 4CO_2$ For $NaOH$:

(4) $\quad 2NaOH + H_2SiF_6 \longrightarrow Na_2SiF_6 + 2H_2O$ and $Na_2SiF_6$ reacting with an excess of $NaOH$:

(4a) $\quad 4NaOH + Na_2SiF_6 \longrightarrow SiO_2\downarrow + 6NaF + 2H_2O$

Under such conditions we have found that, once the silica has precipitated in the bed, it can be rendered soluble and removed only by a treatment of excess strong $NaOH$ solution (10% $NaOH$) producing soluble sodium silicate ($Na_2SiO_3$) as follows:

(5) $\quad SiO_2 + 2NaOH \longrightarrow Na_2SiO_3 + H_2O$

However, the precipitation trouble as well as the cost of precipitate removal can be avoided by using the alkali regenerant, such as $NaOH$, in relatively high dilution, for instance on the order of 0.5%. In other words, when the anion bed has been exhausted with the water containing the $H_2SiF_6$, it is regenerated with dilute caustic. The strength of the caustic solution that can be used for regeneration is determined by the temperature of the surroundings, and this concentration should not be so high that the concentration of the $Na_2SiF_6$ produced in the regeneration becomes super-saturated and precipitates. Hence, at a temperature of 25° C. the $NaOH$ concentration should be on the order of 0.4% by weight or about 0.1 N. This strength is probably safe down to a temperature slightly below 20° C. If it were possible to maintain a temperature of 40° C., the strength of $NaOH$ could be increased by about 30% because of the increased solubility of $Na_2SiF_6$. At 80° C. the concentration would be increased about 100% to about 0.2 N.

The regeneration with the dilute $NaOH$ solution takes place according to the following equation in terms of ion exchange:

(6) $\quad YH_2SiF_6 + 2NaOH \rightarrow Y + Na_2SiF_6 + 2H_2O$ (where Y represents the structure of the anion exchange material); or written as a chemical equation:

(6a) $\quad H_2SiF_6 + 2NaOH \rightarrow Na_2SiF_6 + 2H_2O$

When using the dilute $NaOH$ solution, the anion bed can be regenerated with four to five equivalents of $NaOH$ per mol of $SiO_2$ adsorbed by the bed, the consumption of caustic being somewhat dependent upon the rate of regeneration. If the bed is regenerated with, say 4% $NaOH$ solution, at least 8 equivalents of $NaOH$ would be required per mol of $SiO_2$ since the reaction that occurs might be expressed by the following equation:

(6b) $\quad Y \cdot H_2SiF_6 + 8NaOH \rightarrow Na_2SiO_3 + 6NaF + 5H_2O$

This equation is actually the result of the operation of Equations 4, 4a, and 5. Therefore an additional amount of reagent is consumed in that the silica is removed from the bed as $Na_2SiO_3$ instead of as $Na_2SiF_6$.

Starting with a freshly alkali regenerated anion exchange bed, in order to effect the substantially complete removal of the silica from the feedwater at the outset where the feedwater had been dosed with the theoretical quantity of HF, we have conditioned the influent end portion of the bed by adding a small quantity of dilute HF solution to the bed until a small band of HF was formed at the influent end. The quantity of HF required to produce a satisfactory band of the acid we have found to be about 6 to 10 equivalents of HF per square foot of bed area. The anion exchange or acid-adsorbing material used was an organic material of the class of synthetic resins sometimes also briefly called exchange resins.

As an example, a 10 inch deep bed of granular anion exchange material in a 1" dia. plastic tube was regenerated with caustic and then exhausted downflow with solution or feedwater containing 60 P. P. M. $SiO_2$ as $H_2SiF_6$. The bed adsorbed 131 meq. $H_2SiF_6$ during exhaustion. After the bed was exhausted it was backwashed to loosen the bed. In this connection the dimension abbreviated as meq. herein stands for milligram-equivalent. This dimension will be understood from the following definition:

A gram equivalent of a substance is the weight of a substance displacing or otherwise reacting with 1.008 grams of hydrogen or combining with one-half of a gram-atomic weight, that is 8.00 grams of oxygen. A meq. or milligram-equivalent is $1/1000$ of a gram-equivalent. Therefore, one gram-equivalent weight of: $H_2SiF_6 = 72.04$ grams, consequently 1 meq. or milligram-equivalent of $H_2SiF_6 = 0.072$ grams, that is to say this bed has adsorbed $131 \times 0.072$ grams.

The exhausted bed was regenerated upflow with 3.32 liters of 0.1 N $NaOH$. A flow rate of 0.5 gal./sq. ft./min. was used during the regeneration. After regeneration the bed was washed with de-ionized water.

In order to be certain that substantially complete conversion of dissolved silica to $H_2SiF_6$ in the feedwater would take place, 20 meq. of HF was added to the top of the bed. Then the feedwater containing 60 P. P. M. $SiO_2$ as $H_2SiF_6$ was passed through the bed.

The efficiency of silica removal from the bed with 0.1 N $NaOH$ appeared to depend upon the flow rate used in the regeneration. Based on regeneration effluent solution analysis, it appeared that when a regeneration flow rate of 0.5 gal./sq. ft./min. was used, complete removal of $SiO_2$ was obtained with about 4 mols of $NaOH$ per mol of $SiO_2$ while at 1 gal./sq. ft./min. it required about 5 mols per mol of $SiO_2$ to remove all of the silica from the bed. With the higher flow rate, more of the $Na_2SiF_6$ is converted to $NaF$.

The capacity of the anion exchange material or exchange resin for $H_2SiF_6$ with a feedwater of 60 P. P. M. of silica was about 4.5 meq. per dry gram or 35,400 meq. per cu. ft. to the silica breakthrough. When an excess HF amounting to about 6 equivalents or 120 gm. of HF per square foot of bed area was added to the top of a 10 inch deep bed, the capacity to the fluoride breakthrough was about 70% of the above figure or 3.2 meq. per gram of exchange resin. Some fluoride leakage (0.2-1.0 P. P. M.) in the effluent water was observed shortly before the fluoride breakthrough occurred.

While it is one of the objects of this invention to recover the fluoride from the spent caustic regeneration liquors by precipitation of the silica therefrom, we have found this to be unfeasible with spent liquors of such high dilution as are necessitated by the conditions described above.

Under the conditions of the foregoing example the composite spent caustic regeneration liquor contains about 1 gram of silica per liter. From solutions of such low concentrations we have found that the silica could not be precipitated at a pH range of 7.5 to 8.5 without the addition of coagulating reagents such as bone glue. The solubility of the precipitated silica at this pH range in the dilute solutions appeared to be between 0.35 and 0.40 gram $SiO_2$ per liter.

Therefore, this invention proposes an alternative mode of regeneration whereby a spent liquor of sufficiently high concentration can be derived. This leads to the description of the Cyclic Process presented in the flowsheet diagram of Figs. 5 to 11.

Referring to the key diagram Fig. 5, the flowsheet of the process cycle with fluoride recovery comprises the water treatment system T proper to the left of the dot-and-dash line K and what may herein broadly be termed the fluoride recovery system R to the right of the dot-and-dash line K. The treatment system T comprises a feedwater storage tank 10' having a feedwater supply 10a', an HF storage tank 11', a mixing and reaction tank 12' in which the feedwater is dosed with HF, a connection 13' from the feedwater tank 10' and a connection 14' from the HF tank 11'; both connections 13' and 14' leading to the mixing and reaction tank 12' and provided with control valves 15' and 16' respectively. A connection or pipe 17' having a control valve 18' leads from the reaction tank 12' to a tank 19' containing a bed of granular anion exchange material 20'. An effluent conduit 21' having a control valve 22' forms a gocse neck G presenting a hydraulic column sufficiently high to balance the liquid level in the exchange tank 19' whereby the substantial submersion of the exchange bed 20' during the water treatment operation is insured.

The feedwater from tank 10' and the HF solution from tank 11' are mixed in the conditioning or reaction tank 12' where silica of the water reacts with HF to produce hydrofluosilicic acid as follows:

$$6HF + SiO_2 \rightarrow H_2SiF_6 + 2H_2O$$

The resulting acid is removed from the water by contact with the anion exchange bed 20' through which the water passes for instance downwardly, thus producing a substantially silica-free effluent water leaving the bed through effluent pipe 21'.

A storage tank 23' with supply therefor indicated at 23a' contains NaOH for regenerating the anion exchange bed 20' after it has been regenerated with $NH_4F$, a supply connection 24' with control valve 25' leading to the exchange tank 19'.

The fluoride recovery system R comprises an $NH_4F$ storage tank 26 and a discharge connection 27 with valve 28, leading from tank 26 to the anion exchange tank 19' for auxiliary regeneration of the exchange bed 20'. An effluent discharge connection or pipe or header 29 leads from the exchange tank 19' and is provided with a control valve 30. This header 29 has a branch connection 31 with valve 32 leading to a tank 33 representing the Caustic Precipitator, a branch 34 with a valve 35 leading to a tank 36 representing the Ammonia Precipitator, past which a valve 37 is provided in the header 29. At point 38 the header 29 splits into two branches 39 and 40, provided with valves 41 and 42 respectively. The branch 39 leads to the storage tank 26 for recovered $NH_4F$. The branch 40 leads to a storage tank 43 for recovered NaF and $NH_4F$ in mixture. A discharge pipe or conduit 44 having a valve 45 leads from tank 43 to a tank 46 containing a bed of cation exchange material 47 and will therefore be called the cation exchange tank where the mixture of NaF and $NH_4F$ from tank 43 is converted to HF.

An effluent discharge pipe 48 having a valve 49 leads from the cation exchange tank 46 to the HF storage tank 11'. A tank 50 is for the storage of $H_2SO_4$ solution to serve for the regeneration of the cation exchange bed 47. An $H_2SO_4$ supply for the tank 50 is indicated at 50a. A discharge pipe 51 with valve 52 leads from tank 50 to the cation exchange tank 46.

A branch pipe 24a provided with a valve 24b leads from the NaOH supply pipe 24' to the tank or Caustic Precipitator 33. An additional control valve 24c is provided in the line 24'. Fluoride make-up for recovery cycle is shown in the form of an NaF supply 43a for mixed fluoride storage tank 43.

A tank 53 for storing $NH_4OH$ has a supply 53a and a discharge pipe 54 provided with a control valve 55 leading to the tank or Ammonia Precipitator 36.

An outlet connection 56 with control valve 57 from the tank or Caustic Precipitator 33, and an outlet 58 with a control valve 59 from the tank or Ammonia Precipitator 36, both lead into a discharge header 60 feeding a pump 61 forcing the liquor through a filter press 62 which has a filtrate outlet connection 63 leading into the header 29 through which it reaches mixed fluoride storage tank 43. The filter cake, that is precipitated silica, is removed from the filter press as indicated at 64.

The Cyclic Process according to the flowsheet of Fig. 5 just described is for the purpose of recovering the fluoride from spent regeneration liquors without appreciable re-cycling of the silica, whereby a considerable reduction in the expenditure of reagent chemicals, especially of HF (or NaF) may be attained.

The Cyclic Process comprises the following main operating phases as represented in the flowsheets of Figs. 5, 6, 7, 8, 9 and 10. Each of these figures shows the cyclic diagram as a whole, although a particular operating phase is indicated in each figure by the shading of the tanks or stations involved and by the heavy lines accentuating the corresponding pipe connections involved.

In this manner Fig. 6 indicates the water treatment phase in which de-ionized feedwater from tank 10' and the theoretical proportion of HF from tank 11' are sent to the reaction tank 12' where silica in water reacts with HF as follows:

$$6HF + SiO_2 \rightarrow H_2SiF_6 + 2H_2O$$

Then as the water passes through pipe 17' and through the anion exchange bed 20' the acid ($H_2SiF_6$) is adsorbed by the bed so that a silica-free water passes therefrom as effluent through the discharge pipe 21'.

The exhaustion or saturation of the bed with $H_2SiF_6$ proceeds as an HF band moves through the bed in the manner and under conditions described above in connection with the Non-Cyclic Process. The net result of the exhaustion of the bed may be represented by the following equation:

(7) $\qquad H_2SiF_6 + Y \rightarrow Y \cdot H_2SiF_6$ where Y is the acid absorbing radical of the anion exchange bed.

One explanation of the mechanism of the absorption of the $H_2SiF_6$ and of the function of the HF band is as follows: The freshly alkali regenerated exchange material is alkaline in reaction and in addition to absorbing $H_2SiF_6$ (see Equation 7) would tend to decompose $H_2SiF_6$ just as any other alkali would do as per equation:

(7a) $\quad 2Y + Y \cdot H_2SiF_6 + 2H_2O \rightarrow 3Y H_2F_2 + SiO_2$ if $H_2SiF_6$ were allowed to contact freshly alkali regenerated exchange material.

Now, if the $H_2SiF_6$ solution (i. e. conditioned feedwater) is compelled to pass through a layer or zone of HF absorbed by exchange material before it can contact freshly alkali regenerated exchange material, the reaction 7a is suppressed and the following reaction may be considered to take place:

(7b) $\quad Y \cdot H_2F_2 + H_2SiF_6 \rightarrow Y H_2SiF_6 + H_2F_2$

The exchange material when combined with HF (HF band) is no longer alkaline in reaction, and therefore does not tend to decompose the $H_2SiF_6$. Hence this HF band may be considered as a barrier acting to prevent direct contact of the $H_2SiF_6$ with freshly alkali regenerated exchange material. The HF liberated according to Equation 7b is carried forward through the bed by the water until it comes in contact with freshly alkali regenerated exchange material, whereupon it will re-form $Y \cdot H_2F_2$ as follows:

(7c) $\qquad Y + 2HF \rightarrow Y \cdot H_2F_2$

In this way the HF band progresses through the bed and maintains itself as a chemical barrier.

In addition to this function the HF band has an equalizing function in the sense that it permits reasonable fluctuations of the HF-dosing rate without affecting the quality of the finished water. In other words, in spite of such possible fluctuations there is no leakage of silica into the finished water. In case the HF-dosing rate has temporarily dropped below theoretical, this equalizing function of the HF-band can be said to be due to the ability of the HF-band to react with silica as follows:

(7d) $\quad SiO_2 + 3Y \cdot H_2F_2 \rightarrow Y \cdot H_2SiF_6 + 2H_2O + 2Y$

While this equation appears to be contradictory to Equation 7a, it apparently takes place as long as there is sufficient excess of $Y \cdot H_2F_2$ present.

In case the HF-dosing rate has temporarily risen above theoretical, Equation 7c operates and stores HF in the band.

Substantially complete exhaustion of the anion exchange bed may be effected in a two bed operation, that is with two anion exchange beds operating in series as indicated in Fig. 4.

Then follows the auxiliary regeneration phase (see Fig. 7); that is, after the anion exchange bed 20' has thus been exhausted or saturated, it is backwashed and then the $H_2SiF_6$ is removed from it by regeneration with a slightly ammoniacal solution of $NH_4F$ which may be passed upflow through the bed. This auxiliary regeneration proceeds according to the equation:

(8) $\quad Y \cdot H_2SiF_6 + 2 NH_4F \rightarrow Y \cdot H_2F_2 + (NH_4)_2SiF_6$ which if written as a purely chemical reaction reads as follows:

(8a) $\quad H_2SiF_6 + 2 NH_4F \rightarrow (NH_4)_2SiF_6 + 2 HF$

In this reaction HF is produced which is adsorbed by the anion exchange bed, the amount of HF produced being equivalent to the $H_2SiF_6$ originally in the bed.

Any residual regenerant solution in the bed is then displaced by wash water being passed through the bed.

Coupled with the auxiliary regeneration phase is the recovery of the fluoride from the spent liquor leaving the anion exchange bed from the $NH_4F$ regeneration by treatment to precipitate the silica from the spent liquor.

In order to precipitate the $SiO_2$ from the spent liquor it can be reacted with a hydroxide such as NaOH or $NH_4OH$; therefore, a number of precipitation treatment variations are possible, for instance the entire spent liquor effluent volume may be treated in the Ammonia Precipitator 36 with $NH_4OH$ flowing from tank 53 through pipe 54, or one portion of the effluent volume may be treated in the Caustic Precipitator while another portion is treated in the Ammonia Precipitator. That is to say, depending upon conditions, the requirements of the fluoride recovery cycle might be satisfied by either the Ammonia Precipitator treatment alone or by the combination of the Caustic and the Ammonia Precipitator treatment. For reasons of clarity of presentation the Caustic and the Ammonia Precipitator treatment are shown in separate diagram Figs. 7 and 8 respectively, whereas a combination of both precipitation phases is represented in Fig. 9.

According to Fig. 8 spent effluent liquor resulting from the auxiliary regeneration with $NH_4F$ passes through effluent pipe 29 and branch 31 into the Caustic Precipitator 33 where it reacts with NaOH solution flowing from tank 23' through pipes 24' and 24a to tank 33, as follows:

(9)
$$(NH_4)_2SiF_6 + 4NaOH \longrightarrow 2NH_4F + 4NaF + SiO_2\!\downarrow + 2H_2O$$

whereby $SiO_2$ precipitates, and which reaction is complete at a pH of about 8.0.

The precipitate containing solution passes through header 60 to pump 61 which forces it through the filter press 62 retaining the $SiO_2$ precipitate as a filter cake and allowing the filtrate and filter washings containing a mixture of $NH_4F$ and NaF to pass on to the storage tank 43.

The fluorides thus recovered in tank 43 are passed through the cation exchange bed 47. This bed comprises a known granular cation exchange material operating in the hydrogen cycle, for instance an organic material of the class of synthetic resins sometimes also briefly called exchange resins. This bed is saturated with H-ions which substitute for the Na and $NH_4$ respectively of the fluorides according to the following exchange equations, producing HF for re-use in the initial conditioning phase of the feedwater:

(10) $\quad H \cdot X + NH_4F \longrightarrow NH_4 \cdot X + HF$

(11) $\quad H \cdot X + NaF \longrightarrow Na \cdot X + HF$

Hence the HF thus recovered is returned to the HF storage tank 11' whence it is again added to de-ionized feedwater to convert silica into $H_2SiF_6$.

The cation bed 47 after exhaustion is regenerated with a suitable mineral acid such as $H_2SO_4$ flowing from tank 50 through pipe 51 to the cation exchange tank 46 and leaving the tank as spent regenerant liquor as at 46a containing $Na_2SO_4$ and $(NH_4)_2SO_4$ as is apparent from the following cation exchange regeneration equations:

(12) $\quad 2NH_4 \cdot X + H_2SO_4 \longrightarrow 2H \cdot X + (NH_4)_2SO_4$

(13) $\quad 2Na \cdot X + H_2SO_4 \longrightarrow 2H \cdot X + Na_2SO_4$

According to Fig. 7 the $NH_4F$ auxiliary regenerant solution from tank 26 passes through pipe 27 to the anion exchange tank 19' and upwardly through the exchange bed 20', while the spent liquor leaves the exchange tank by way of effluent pipe or header 29, to pass through branch 34 into the Ammonia Precipitator 36 where it reacts with $NH_4OH$ flowing from tank 53 through pipe 54 to tank 36, as follows:

(14) $\quad (NH_4)_2SiF_6 + 4NH_4OH \longrightarrow 6NH_4F + SiO_2\downarrow + 2H_2O$ whereby $SiO_2$ precipitates.

The solution from the Ammonia Precipitator containing the $SiO_2$ precipitate passes through outlet header 60 and pump 61 into and through the filter or filter press 62 where the silica is retained as filter cake, while the filtrate solution containing the $NH_4F$ passes through pipes 63 and 39 to tank 26 for storage and re-use as auxiliary regenerant solution.

The filtrate and strong filter wash solution may thus be reserved to meet $NH_4F$ requirements of the next operating cycle, while weak wash solution may be sent to tank 43 for conditioning treatment in the cation exchange bed 47. Undue dilution of the auxiliary regenerant solution of $NH_4F$ is thus avoided. Maintaining the spent $NH_4F$ liquors at higher concentrations means less re-cycling of silica due to the smaller volume of liquor being handled.

Fig. 9 represents the aforementioned combination of caustic precipitation and ammonia precipitation treatment of the spent auxiliary regenerant liquor, which combination will be understood in view of the foregoing description of each of these treatments per se in Figs. 7 and 8 respectively, and in view of the above chemical reactions involved.

That is to say a first portion or volume of the spent auxiliary effluent liquor volume from the anion exchange bed 20' is sent into and through the Caustic Precipitator 33 while NaOH from tank 23' is used as a precipitant. Then the caustic precipitation is stopped, and a second or subsequent portion which may include some of the wash water displacing the spent liquor from the bed, is sent into and through the Ammonia Precipitator where it reacts with $NH_4OH$ as a precipitant from tank 53. The first volume, after having its $SiO_2$ precipitate removed from it in passing through the filter press 62, passes to the tank 43 for storing the mixed fluoride NaF and $NH_4F$. The second volume following the first also passes through filter press 62 to have its $SiO_2$ precipitate removed, and the filtrate liquor passes to the tank 26 for the storage of $NH_4F$.

The proportions of the first and second volumes of $(NH_4)_2SiF_6$ to be thus treated in the respective $SiO_2$ precipitation steps depends upon the chemical requirements of the process and upon the fluoride balance to be established in the recovery cycle; that is, the spent $NH_4F$ or $(NH_4)_2SiF_6$ effluent solution is divided so that about one-half of the silica goes into each of the precipitators. The first portion or volume of the solution, namely the fraction with the highest silica concentration is sent to the Caustic Precipitator 33, while the remainder is sent to the Ammonia Precipitator. The portion of the spent $NH_4F$ regeneration liquor sent to the Ammonia Precipitator 36 will have a lower concentration of silica than the fraction sent to the Caustic Precipitator 33, since an excess of $NH_4F$ solution must be used in the regeneration. The actual split will be determined by the ratio of $(NH_4)_2SiF_6$ to $NH_4F$ required, since a fluoride balance must be maintained in the system.

The fluoride make-up may be introduced into the cycle in the form of NaF which may be added as indicated at 43a in the necessary quantity to the contents of the mixed fluoride storage tank 43.

After the anion exchange bed 20' has been saturated with HF as a result of the auxiliary regeneration with $NH_4F$, there follows the Fig. 10 phase of the cycle, namely the second regeneration of the bed with caustic (NaOH) flowing from the tank 23' through pipe 24' to the anion exchange tank 19'. As the caustic regenerant solution passes through the bed 20', for instance upflow, it removes all or most of the HF by way of the following exchange reaction:

(15) $\quad Y \cdot H_2F_2 + 2NaOH \rightarrow Y + 2NaF + H_2O$ whereby the bed is left in an alkaline state and thus ready again for the silica removal treatment of de-ionized feedwater from tank 10'. The effluent liquor containing the NaF from this regeneration is sent through pipes 29 and 40 to the mixed fluoride storage tank 43.

Prior to starting the feedwater through the bed, an HF band such as described above in connection with the Non-cyclic Process, may be established at the influent end of the bed by the addition of a small but adequate amount of HF to the bed prior to starting, or by stopping the upflow of the caustic solution through the bed short of complete regeneration thereof, that is at a point where a suitable band or zone of HF will be left at the top of the bed, which band will be met by the downflowing feedwater.

In the second or alkali-regeneration stage of the anion exchange bed $NH_4OH$ may be substituted for the NaOH as the regenerant solution. We have found the NaOH to be more effective in removing final traces of residual silica from the bed, although the effect caused by the incomplete removal of silica can be overcome by the addition of HF to the top of the bed in somewhat greater quantity than required when NaOH is used.

While the spent or NaF-containing solution resulting from the alkali regeneration of the bed is shown in Fig. 10 to be sent directly to storage tank 43 for treatment in the cation exchange bed 47, if that solution contains an appreciable quantity of silica, it can be sent to the Caustic Precipitator 33 for removal of the silica prior to entering the storage tank 43. The regenerated anion exchange bed 20' is washed to remove the residual free NaOH and NaF from the bed. If an HF-zone has been left at the top of the bed by preceding upflow regeneration, the washing may be considered sufficient when the pH of the wash liquid has dropped to the acid side. This criterion is due to the fact that HF will slough off from the HF-zone at the top of the bed.

In the auxiliary regeneration of the anion exchange bed 20' we have found that ammoniacal $NH_4F$ with a pH between 8.0 and 8.5 gives good results in the removal of silica from the bed. At this pH range about 3%–5% of the nitrogen is present as free $NH_4OH$. The small amount of OH appears to be necessary for releasing all of the $H_2SiF_6$ from the bed. If the bed is not completely exhausted, some $OH^-$ would be present since the anion exchange material will split some of the $NH_4F$ to produce $OH^-$.

An effective procedure for obtaining a silica-free bed, following the auxiliary regeneration with $NH_4F$, is to treat it with 110%–125% theoretical NaOH. If excess caustic is used, the method of using a sequence of beds should be used when exhausting with feed water, for effecting an automatic transfer of the HF-zone from one bed to the next.

When using $NH_4OH$ instead of NaOH in the final regeneration of the anion exchange bed, we have found that most of the silica was removed from the bed as a suspension. We have obtained good results with 300% $NH_4OH$ of 3 N. concentration. Although in some instances a small portion of silica failed to be removed, the remaining silica appeared to be very near the top or feedwater influent end of the bed since we found that portion could be tied up in the exchange material by adding a somewhat larger quantity of HF to the top of the bed than was otherwise required. In this way a satisfactory operation was achieved. The $NH_4F$ solution containing excess $NH_4OH$ resulting from this operation may be used as a source of ammonia in the ammonia precipitator.

Where the concentration of silica is low as in the solutions resulting from the caustic treatment of the bed, we have found that the addition of about two pounds of bone glue per 1,000 gallons of solution aids in the precipitation and flocculation of the silica.

We have furthermore found that the filtration property of the precipitated silica depends upon the alkalinity condition during the precipitation. An easily filterable precipitate, that is a white semicrystalline product, can be obtained by adding the spent $NH_4F$ solution slowly into a tank containing the theoretical quantity of strong $NH_4OH$ solution. In this way most of the silica is precipitated under condition of shock when coming into contact with an excess of the strong ammonia solution. Since this method of precipitation employs the theoretical quantity of $NH_3$ it is important in the economy of the process.

Furthermore we have found that an easily filterable silica is obtained by adding a considerable excess of strong ammonia to the spent $NH_4F$ solution, for instance about 25% excess $NH_3$ is added during the precipitation. However, this means an additional 25% consumption of $H_2SO_4$ for the regeneration of the cation cells in the conditioning system besides the cost of the excess $NH_3$ used. When a considerably lower excess of $NH_3$, for instance only about 5% excess $NH_3$ is used in the precipitation, we have found that a clear gelatinous precipitate is formed that filters with difficulty.

We have found that the moisture content of the filter cake depends upon the character of the silica precipitate. When the clear gelatinous precipitate was formed, a filter cake containing only 4.5 to 5% solids was obtained while with the white semi-crystalline precipitate a filter cake containing about 16% solids was obtained. With an average 9 to 10% solids content of the filter cake there would be produced about 10 cubic feet of filter cake per pound mol (60#) of silica.

While HF may be added directly to the feedwater for conditioning, or NaF may be introduced into the recovery cycle to make up for losses, $NH_4HF_2$ represents still another source.

The fluoride recovery cycle is flexible in that single-stage or ammonia precipitation on the one hand, and two-stage or combination caustic and ammonia precipitation on the other hand may be employed.

In practicing the single-stage or ammonia precipitation method alone, an analysis of the composite spent $NH_4F$ solution presents itself as follows:

0.22 N. $(NH_4)_2SiF_6$ and 0.654 N. $NH_4F$

In practicing the two-stage or combination caustic and ammonia precipitation method, an analysis of the resulting solutions presents itself as follows:
For the caustic precipitation:

0.40 N. $(NH_4)_2SiF_6$ and 0.25 N. $NH_4F$

For the ammonia precipitation:

0.12 N. $(NH_4)_2SiF_6$ and 0.85 N. $NH_4F$

Fig. 11 represents the chemical flowsheet of the cyclic process with ammonia precipitation alone, while Fig. 12 represents the chemical flowsheet with combination caustic and ammonia precipitation.

The chemical requirements or balance of the fluoride recovery cycle are determinable on the basis of 1 mol of silica in the feedwater. Using one pound mol of silica as the basis, it appears (see Equation 1) that six equivalents of HF are required to react with 1 mol of silica to produce two equivalents of $H_2SiF_6$. The six equivalents of HF required in the above reaction are obtained by passing through the cation bed 47 the mixture of NaF and $NH_4F$ solutions collected from the caustic treatment of the anion exchange bed 20' and from neutralization of a portion of the spent $NH_4F$ liquor.

The two equivalents of $H_2SiF_6$ produced in the reaction (Equation 1) are adsorbed by the anion exchange bed 20'. The exhausted bed is regenerated with $NH_4F$. Assuming the regeneration requires 400% theoretical $NH_4F$, then eight equivalents of $NH_4F$ are required for the auxiliary regeneration. The resulting spent regenerant liquor will contain two equivalents of $(NH_4)_2SiF_6$ and six equivalents of unreacted $NH_4F$. In the $NH_4F$ regeneration reaction (Equation 8a) two equivalents of HF are produced which the bed absorbs.

If the bed is then treated with the two equivalents of NaOH (according to Equation 15), this will produce two equivalents of NaF to be sent to the mixed fluoride storage tank 43, furnishing one-third of the required fluorides for the feedwater conditioning reaction. The remainder of four equivalents of fluorides must come from the neutralization of the $NH_4F$ regeneration effluent liquor containing both $(NH_4)_2SiF_6$ and $NH_4F$.

Referring to the chemical flowsheet Fig. 11 for single stage or ammonia precipitation, when a 1 N $NH_4F$ solution is used for the regeneration of the bed, and the silica is removed from the bed as $(NH_4)_2SiF_6$, and on the assumption that 400% of the theoretical quantity of $NH_4F$ be used in the regeneration, then the resulting spent effluent liquor contains two equavilents of $(NH_4)_2SiF_6$ and six equivalents of $NH_4F$ for each mol of silica that was in the bed. Thus the concentration of the effluent liquor presents itself as about 0.25 N $(NH_4)_2SiF_6$ and 0.75 N $NH_4F$.

The precipitation of the silica from the spent regenerant liquor will require four equivalents of $NH_4OH$. The precipitation reaction converts the two equivalents of $(NH_4)_2SiF_6$ into six equivalents of $NH_4F$ and one mol of $SiO_2$. Therefore, the neutralized effluent liquor will contain a total of twelve equivalents of $NH_4F$. After filtration this solution is divided so that eight equivalents will be retained in the $NH_4F$ storage tank 26 to be used in the next fluoride recovery cycle. The other four equivalents of $NH_4F$ are sent to the mixed fluoride tank 43 to be converted into HF by being passed through the cation exchange bed 47.

Hence a summary of the chemical requirements in view of the Fig. 11 flowsheet presents itself as follows:

A. Basis: 1 mol of $SiO_2$ in the feedwater.
B. Assumptions:
   (a) Regeneration of anion exchange bed requires 400% of the theoretical $NH_4F$: 8 eq. $NH_4F$
   (b) Acid requirement for regenerating the cation exchange bed: 150%
C. Process (with single-stage silica precipitation, i. e. ammonia precipitation):
   (a) Caustic treatment of anion exchange bed: 2 eq. NaOH
   (b) Precipitation of silica from spent $NH_4F$ liquor: 4 eq. $NH_4OH$
   (c) Acid for regenerating cation exchange bed at 150%: 9 eq. $H_2SO_4$
D. Exhaustion of anion exchange bed: 1 mol of $SiO_2$ requires 6 eq. HF
E. Regeneration of anion exchange bed: At 400% 8 eq. $NH_4F$ produce: 2 eq. $(NH_4)_2SiF_6$ and 6.0 eq. $NH_4F$
F. Precipitation of silica: 4 eq. $NH_4OH$ for 1 mol $SiO_2$ recovered.
G. Cation exchange cycle:
   (a) Exhaustion of cation exchange bed with mixed fluoride solution containing NaF and $NH_4F$: namely 2 eq. NaF and 4 eq. $NH_4F$, the resulting effluent solution representing 6 eq. HF.
   (b) Regeneration with 150% $H_2SO_4$ required 9 eq., the resulting effluent representing 3 eq. $H_2SO_4$, 2 eq. $Na_2SO_4$, and 4 eq. $(NH_4)_2SO_4$.

Referring to the chemical flowsheet Fig. 12 for two-stage or combined caustic and ammonia precipitation; when $NH_4F$ solution of 1 N. concentration is used for regeneration to remove the silica from the bed, and if the regeneration efficiency is assumed to be 50% to remove one-half of the silica, then this portion of the effluent will be 0.5 N $NH_4F$ and 0.5 N $(NH_4)_2SiF_6$ and will contain 1 equivalent of $(NH_4)_2SiF_6$ and 1 equivalent $NH_4F$. Neutralization and precipitation of the silica with NaOH from the solution containing 1 eq. $(NH_4)_2SiF_6$ will (according to Equation 9) require 2 equivalents of NaOH and will produce 2 equivalents of NaF and 1 equivalent of $NH_4F$. Therefore, the solution, after neutralization and removal of silica, will contain a total of 2 equivalents of NaF and 2 equivalents of $NH_4F$, and thus will furnish the remainder of the fluoride required for the feedwater conditioning reaction.

The second portion of the spent $NH_4F$ effluent liquor will contain 1 equivalent of $(NH_4)_2SiF_6$ and 5 equivalents of $NH_4F$. Neutralization and precipitation of the silica with $NH_4OH$ (see Equation 14) will require 2 equivalents of $NH_4OH$, producing 3 equivalents of $NH_4F$. Therefore, the resulting solution after silica removal will contain a total of 8 equivalents of $NH_4F$, thus satisfying the requirement for the $NH_4F$ regeneration.

A summary of the chemical requirements of the Fig. 12 two-stage precipitation method presents itself the same as above for the Fig. 11 single-stage method, except for the item "C" which now designated as "$C_1$" presents itself as follows:

$C_1$—Process: Two-stage silica precipitation:
   (a) Caustic treatment of the anion exchange bed requires 2 eq. NaOH
   (b) Removal of silica from spent $NH_4F$ liquor sent to mixed fluoride tank 43, requires 2 eq. NaOH
   (c) Removal of silica from spent $NH_4F$ liquor, for auxiliary regeneration in the next cycle, 2 eq. $NH_4OH$
   (d) Acid for regenerating the cation exchange bed at 150% efficiency, 9 eq. $H_2SO_4$

We claim:

1. A process for removing silica from $SiO_2$-containing water which comprises bringing together and reacting the silica in the water with a quantity of hydrofluoric acid to produce hydrofluosilicic acid, adsorbing the acid by passing the water through a bed of acid-adsorbing anion exchange material, flowing through the bed in submergence a solution of ammonium fluoride whereby hydrofluoric acid replaces hydrofluosilicic acid in the bed and whereby there passes from the bed a fluosilicate solution adapted to have the silica precipitated therefrom, and thereafter regenerating the bed by passing therethrough an alkali solution whereby there passes from the bed a fluoride solution.

2. A process according to claim 1, in which one portion of the fluosilicate solution is reacted with caustic soda and another portion is brought together and reacted with ammonium hydroxide to precipitate the silica from the respective portions, and the resulting respective fluoride solutions are separated from their precipitates whereby there are obtained as separate fractions a mixed fluoride solution from the one portion and an ammonium fluoride solution from the other portion, and the mixed fluoride solution is converted into hydrofluoric acid by passing it through a bed of H-ion regenerated cation exchange material.

3. A process according to claim 1, in which a quantity of said fluosilicate solution is brought together and reacted with caustic soda to effect precipitation of the silica and the resulting fluoride solution is separated from the silica and is adapted for reuse.

4. A process according to claim 1, in which one portion of the fluosilicate solution is brought together and reacted with caustic soda and another portion is reacted with ammonium hydroxide to effect precipitation of the silica from the respective portions whereby there are obtained as separate fractions a mixed fluoride solution from the one portion and an ammonium fluoride solution from the other portion, with said fluoride solutions being adapted for reuse.

5. A process according to claim 1, in which a quantity of the fluosilicate solution is brought together and reacted with ammonium hydroxide to effect the precipitation of silica therefrom, and the resulting ammonium fluoride solution is separated from the precipitate and is adapted for reuse.

6. A process according to claim 1, in which a quantity of said fluosilicate solution is brought together and reacted with caustic soda to effect the precipitation of the silica, the resulting fluoride solution separated from the precipitate, and said fluoride solution converted into hydrofluoric acid by passing it through a bed of cation exchange material operating in the hydrogen ion cycle.

7. A process according to claim 1, in which the fluoride solution resulting from the alkali regeneration of the exchanger bed is converted to hydrofluoric acid by passing it through a bed of cation exchange material operating in the hydrogen ion cycle.

8. The process according to claim 1, in which a quantity of said fluosilicate solution is brought together and reacted with caustic soda to effect the precipitation of the silica, the resulting fluoride solution separated from the precipitate and said fluoride solution converted into hydrofluoric acid by passing it through a bed of cation exchange material operating in the hydrogen ion cycle, with the addition that NaF is also passed through said bed to supply a make-up quantity of hydrofluoric acid.

WALFRED W. JUKKOLA.
ELLIOTT J. ROBERTS.

REFERENCES CITED

The following references are of record in the file of this patent:

UNITED STATES PATENTS

| Number | Name | Date |
|---|---|---|
| 404,180 | Doremus | May 28, 1889 |
| 807,412 | Wixford | Dec. 12, 1905 |
| 1,966,733 | Reimers | July 17, 1934 |
| 1,978,447 | Austerweil et al. | Oct. 30, 1934 |
| 2,127,310 | Riley | Aug. 16, 1938 |
| 2,155,318 | Liebknecht | Apr. 18, 1939 |
| 2,226,134 | Liebknecht | Dec. 24, 1940 |
| 2,248,055 | Bird | July 8, 1941 |
| 2,267,831 | Liebknecht | Dec. 30, 1941 |
| 2,267,841 | Riley | Dec. 30, 1941 |
| 2,287,486 | Reichelt et al. | June 23, 1942 |
| 2,330,865 | Butzler | Oct. 5, 1943 |

FOREIGN PATENTS

| Number | Country | Date |
|---|---|---|
| 314,067 | Great Britain | Dec. 11, 1930 |